US005454581A

United States Patent [19]

Ringer

[11] Patent Number: 5,454,581

[45] Date of Patent: Oct. 3, 1995

[54] COMBINATION WHEELCHAIR DESK AND STORAGE AREA

[75] Inventor: Fred J. Ringer, Bakersfield, Calif.

[73] Assignee: Ringer & Adams, P.D., Bakersfield, Calif.

[21] Appl. No.: 163,372

[22] Filed: Dec. 7, 1993

[51] Int. Cl.[6] .............................. A47B 83/02; B62B 1/00

[52] U.S. Cl. .................................... 280/304.1; 280/250.1; 108/42; 108/38; 297/155; 297/162; 297/188.21

[58] Field of Search .............................. 280/304.1, 250.1; 108/25, 44, 42, 38; 297/161, 148, 153, 155, 162, 194

[56] References Cited

U.S. PATENT DOCUMENTS

| | | | |
|---|---|---|---|
| 4,428,616 | 1/1984 | Hamilton | 297/145 |
| 4,526,419 | 7/1985 | Bowman et al. | 297/194 X |
| 4,632,451 | 12/1986 | Lee | 297/153 |
| 4,779,884 | 10/1988 | Minati | 280/304.1 |
| 4,867,506 | 9/1989 | Chavez | 297/188 |
| 4,878,685 | 11/1989 | Bahm | 280/304.1 |
| 4,895,418 | 1/1990 | Medellin et al. | 108/38 X |
| 5,026,114 | 6/1991 | Miller | 297/15.5 X |
| 5,228,711 | 7/1993 | Summers | 280/304.1 |

OTHER PUBLICATIONS

Robinault, Isabel Pick, *Functional Aides For The Multiply Handicapped.* (1973).

*Primary Examiner*—Eric D. Culbreth
*Assistant Examiner*—F. Zeender
*Attorney, Agent, or Firm*—Lyon & Lyon

[57] ABSTRACT

A desk pivotally mounted to a wheelchair frame having a storage compartment. Through hinges, the desk cover pivots, opening and closing the storage compartment, and the desk cover can be completely removed to open the storage area. Further, the desk cover can be held open by a support latch or locked closed. Associated with the desk is a rod on which the desk pivots. The rod is then attached to the wheelchair frame with clamps. The height of the desk relative to the wheelchair is adjustable by multiple methods.

5 Claims, 7 Drawing Sheets

FIG. 11.
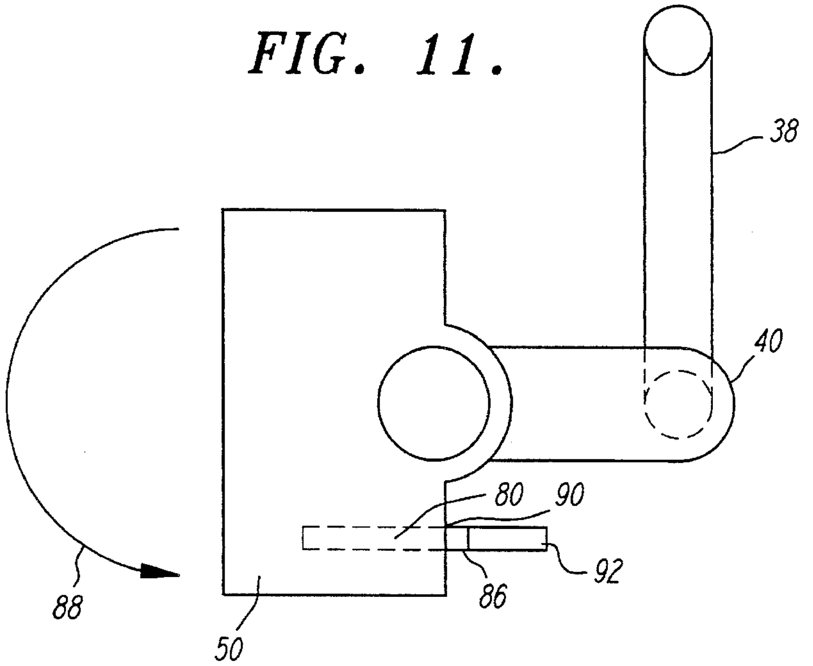
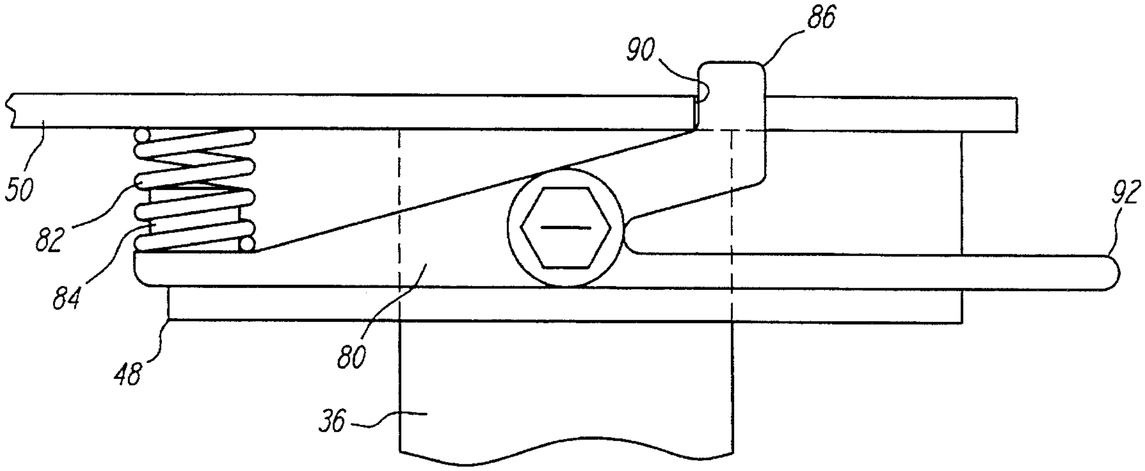
FIG. 12.

COMBINATION WHEELCHAIR DESK AND STORAGE AREA

BACKGROUND OF THE INVENTION

The field of the present invention is devices to aide the handicapped.

With goals of increased efficiency and independence, individuals have attempted to design attachments for wheelchairs and similar apparatus. As the number of wheelchair users continues to increase among students, office workers, and active homemakers, a need for an attachment functioning as a desk and storage compartment for transporting materials has arisen. However, despite the present need, marketable attachments which function as both a desk and storage area are not available.

Society's attitude toward the handicapped is changing. This change is partially manifested in laws requiring the availability of apparatus providing the handicapped with convenient access to buildings and other facilities, but the average individual still cannot appreciate the difficulties confronting a wheelchair user trying to find a functional work station. Because desks must be specially designed, the wheelchair user cannot find a desk in every location in which the individual must work.

The prior art has provided apparatus which attach to wheelchair frames and function as desk tops. However, because these apparatus are bulky, flimsy, or difficult to attach and detach, they are impractical for everyday use. Many of the devices cannot be moved to a non-operative position by the wheelchair user alone. Thus, the individual must have assistance to get in and out of the wheelchair, and the independence of the individual is, therefore, impeded. Other devices are unduly complicated. They tilt and slide in and out making them undesirable for many wheelchair users. Further, many attachments require that modifications be made to the wheelchair before mounting the attachment. Also, the only storage space provided for transporting materials is the surface area of the tray top, and no means is provided to keep the materials on the tray top while the wheelchair is moving. The handicapped individual cannot power the wheelchair with one hand while holding the materials with the other. The prior art solves this problem by mounting an independent storage attachment to the wheelchair. Though this solution solves the material transportation problem, it adds unnecessary bulk to the wheelchair, and the storage space is not conveniently located.

SUMMARY OF THE INVENTION

The present invention is directed to a single attachment which combines a desk top and a storage compartment. To this end, a cover is pivotally attached to a body which is pivotally attached to a wheelchair. The body easily pivots in and out of its operative position allowing the wheelchair user to get in and out of the wheelchair independently, and the cover may be pivoted open to access a storage compartment in the body. The cover is flat thereby acting as a desk top In a separate aspect of the invention, the cover is detachable or it may be locked in an open position by a support latch. Further, the cover can have a raised edge to prevent materials from sliding off the cover, and the cover also has an indentation which can serve as a cup holder or pencil holder. Finally, the height of the desk is adjustable to accommodate users of various sizes.

Accordingly, it is an object of the present invention to provide a desk with a storage compartment attachable to any wheelchair. Other and further objects and advantages will appear hereinafter.

BRIEF DESCRIPTION OF THE DRAWINGS

FIG. 11 is a top view of the spring lock.

FIG. 12 is a side view of the spring lock.

DETAILED DESCRIPTION OF THE PREFERRED EMBODIMENT

Figure 1:
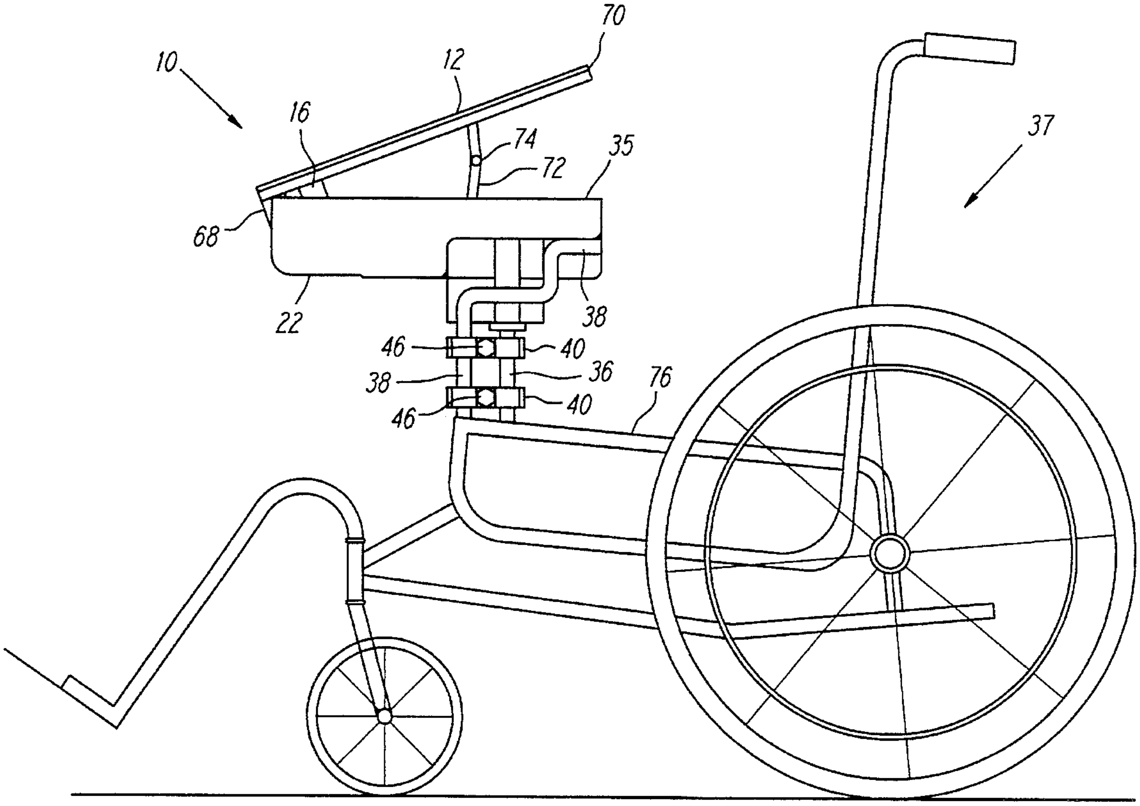
FIG. 1 is a schematic side view of the desk mounted to a wheelchair.

Turning in detail to the drawings, FIG. 1 illustrates a desk pivotally mounted to a wheelchair. The wheelchair has four wheels, a frame, and a seat. The desk pivots on a pivot rod which is attached to the wheelchair frame by two clamps. The desk is shown in an operative position extending across and above the wheelchair seat and arms. The desk may be rotated on the pivot rod to a nonoperative position in which the desk is positioned proximate a side and in front of the wheelchair. As FIG. 1 illustrates, the cover pivots upward to open the storage compartment, and it can be locked open by a latch. When closed, the cover functions as a desk top upon which the user may type, write, or perform other tasks.

Figure 2:
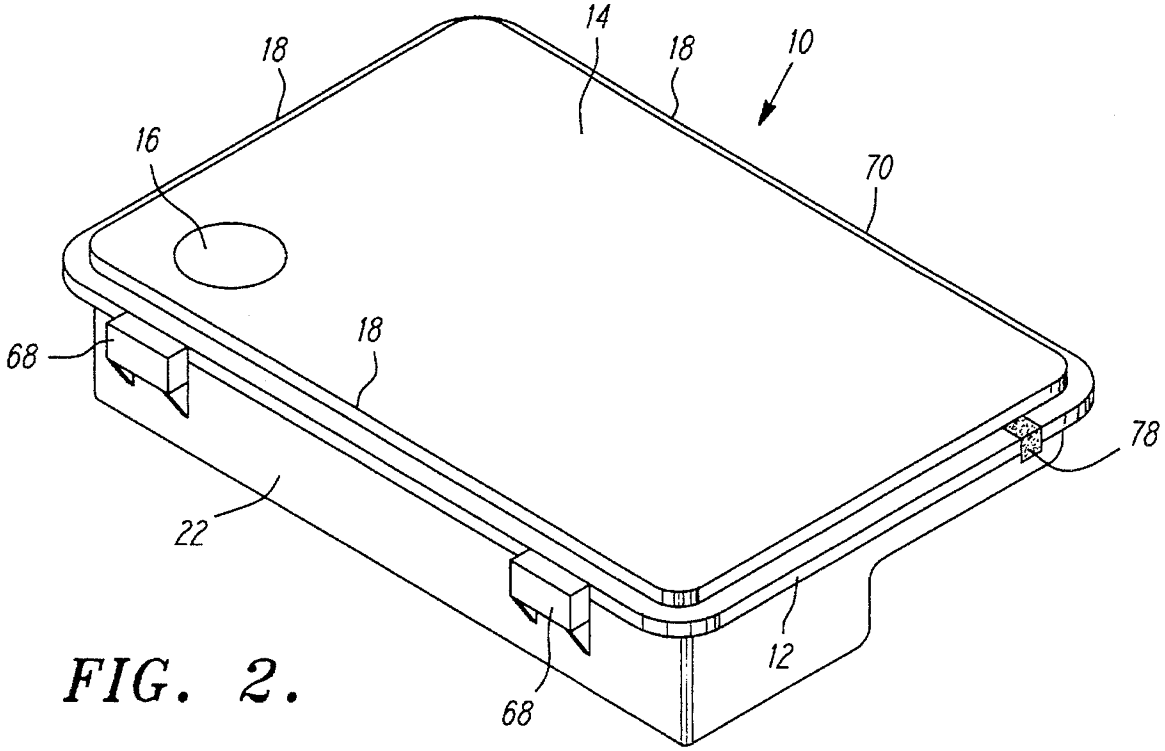
FIG. 2 is an isometric view of the desk with the cover closed.

In the preferred embodiment of the desk, generally designated 10 and shown by FIG. 2, the rectangular cover 12 provides a smooth, planar, and substantially horizontal work area 14 of approximately 2.8 square feet. In one corner of the cover 12 is an indentation 16. The indentation 16 has generally vertical walls and is substantially circular which includes shapes such as pentagonal. The indentation 16 functions, for example, as a cup holder or pencil holder, so any shape suitable for these or similar functions is intended. The edge 18 of the cover 12 is raised above the work area 14. The raised edge 18, which is rounded, prevents materials from sliding off the work area 14 when the desk, generally designated 10, is tilted or moving.

Figure 3:
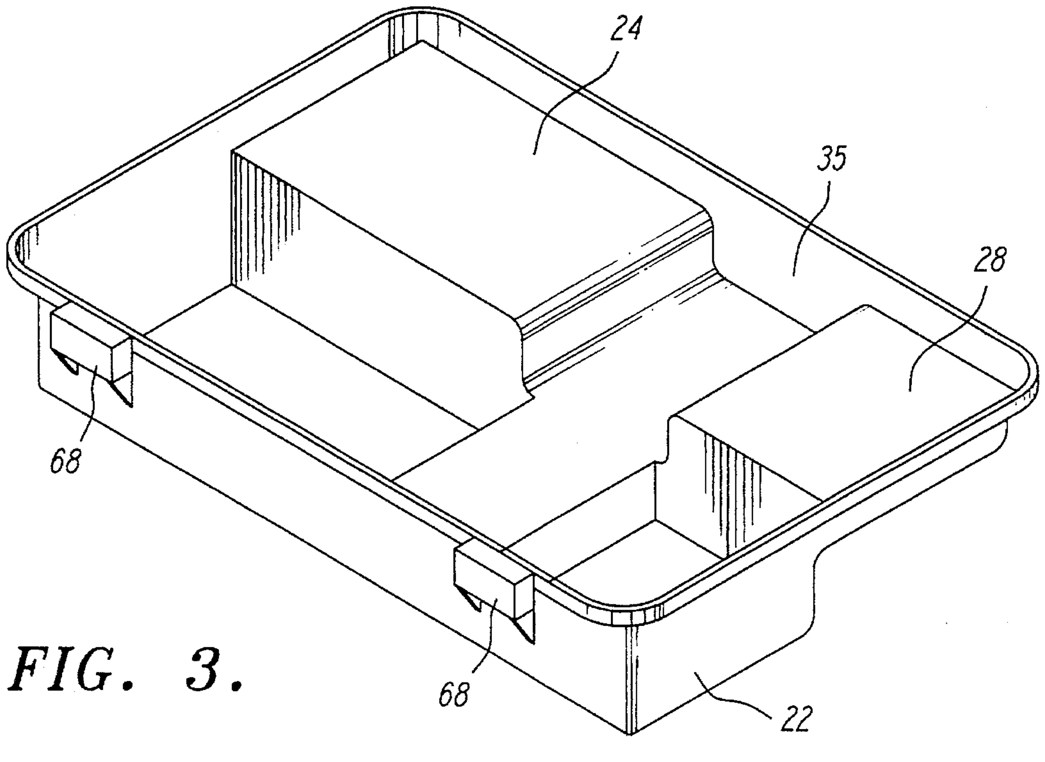
FIG. 3 is an isometric top view of the desk with the cover removed.
Figure 4:
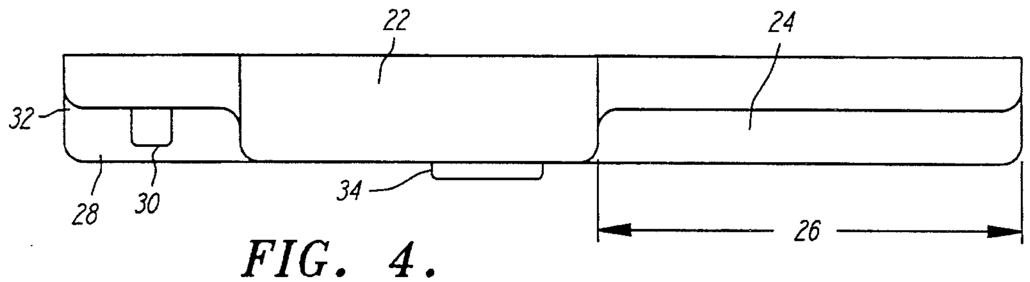
FIG. 4 is a front end view of the body.
Figure 5:
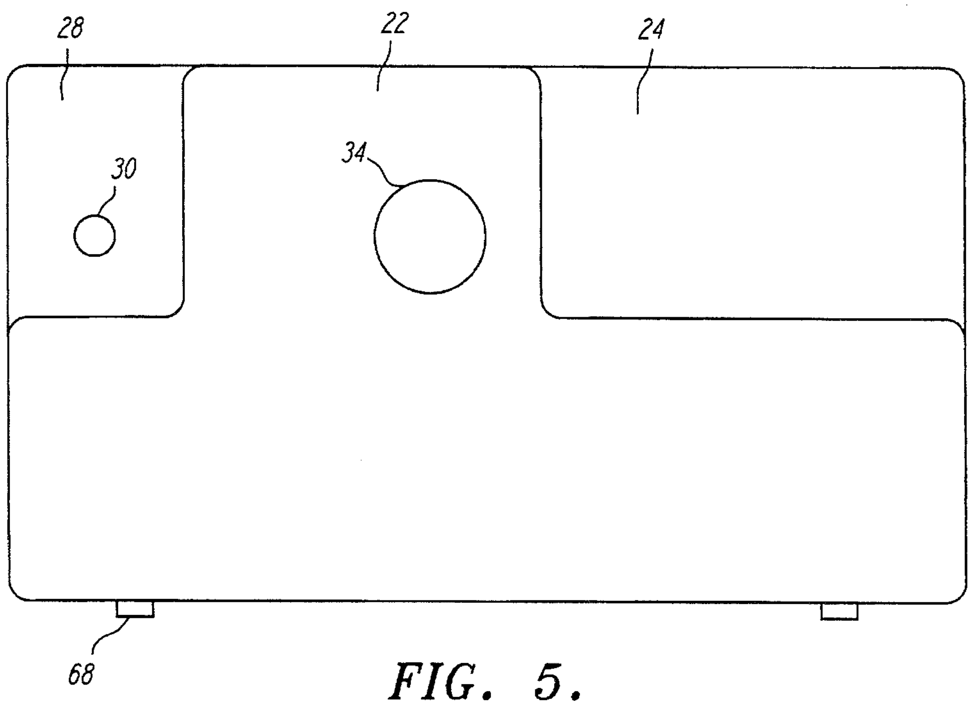
FIG. 5 is a bottom view of the body.
Figure 5A:
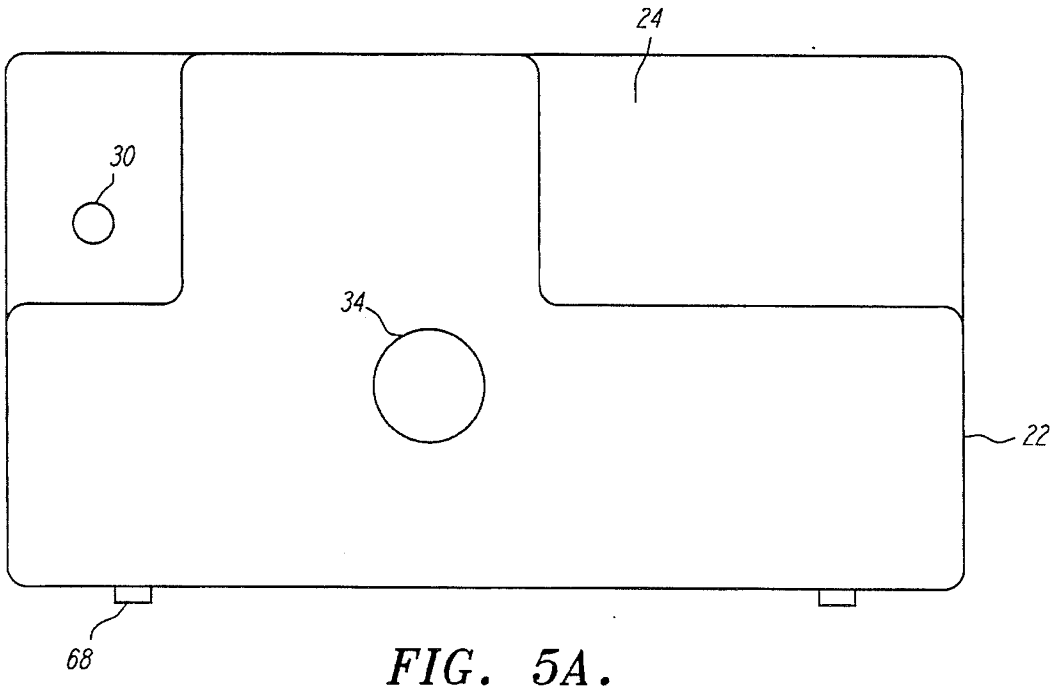
FIG. 5A is a bottom view of the body illustrating an alternate embodiment for the placement of the large peg lock.

The desk's body 22 is illustrated in detail by FIG. 3, FIG. 4, and FIG. 5. In the preferred embodiment, the body 22 is essentially a rectangular box open at the top. On the right side of the body 22 is an adjustment indent 24 which assures the desk's compatibility with diverse designs of wheelchairs. The arm or frame of the wheelchair instead of interfering with the desk 10 occupies the space left open by the adjustment indent 24. The width, shown generally at 26 in FIG. 4, of the adjustment indent 24 allows the desk 10 to be mounted on wheelchairs of different widths. The body 22 also has an arm indent 28 which serves the same purpose as the adjustment indent 24. The arm indent 28 also reduces the moment that the small peg lock 30 must withstand. The moment is reduced by shortening the distance between the center of the load and the small peg lock 30. This is accomplished by raising the small peg lock 30 to the center 32 of the body 22. In the preferred embodiment, the small peg lock 30 is approximately one inch in diameter and one inch long. Thus, the small peg lock 30, which is located toward the edge of the body, stably supports the large moments created by heavy loads placed on the desk 10. The large peg lock 34, which is located toward the center of the body, is approximately three inches in diameter and ½ inch tall. The large peg lock 34 allows the desk 10 to stably support heavy vertical loads. As FIG. 5A illustrates, the large peg lock 34 can be moved closer to the geometric center of the body 22 without modifying the mounting apparatus. Moving the large peg lock 34 closer to the center of the body 22 reduces the moments created by the loads placed on the desk.

As FIG. 3 shows, the body 22 also provides a storage compartment 35. The wheelchair user can utilize the compartment 35 to store supplies such as pencils and paper. Further, the compartment 35 may be used to transport materials from one location to another. With the cover 12 removed, as FIG. 3 illustrates, materials can be piled high on the body 22.

Figure 6:
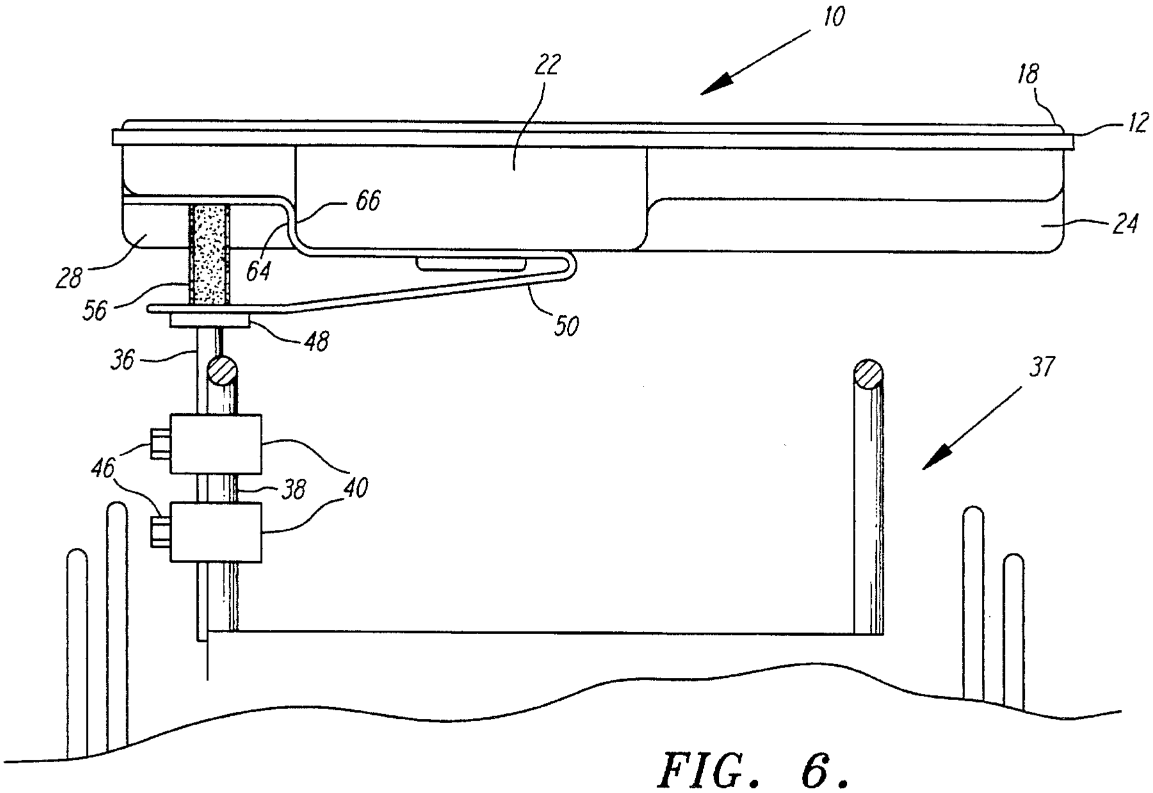
FIG. 6 is a schematic front end view of the body mounted to a wheel chair.
Figure 7:
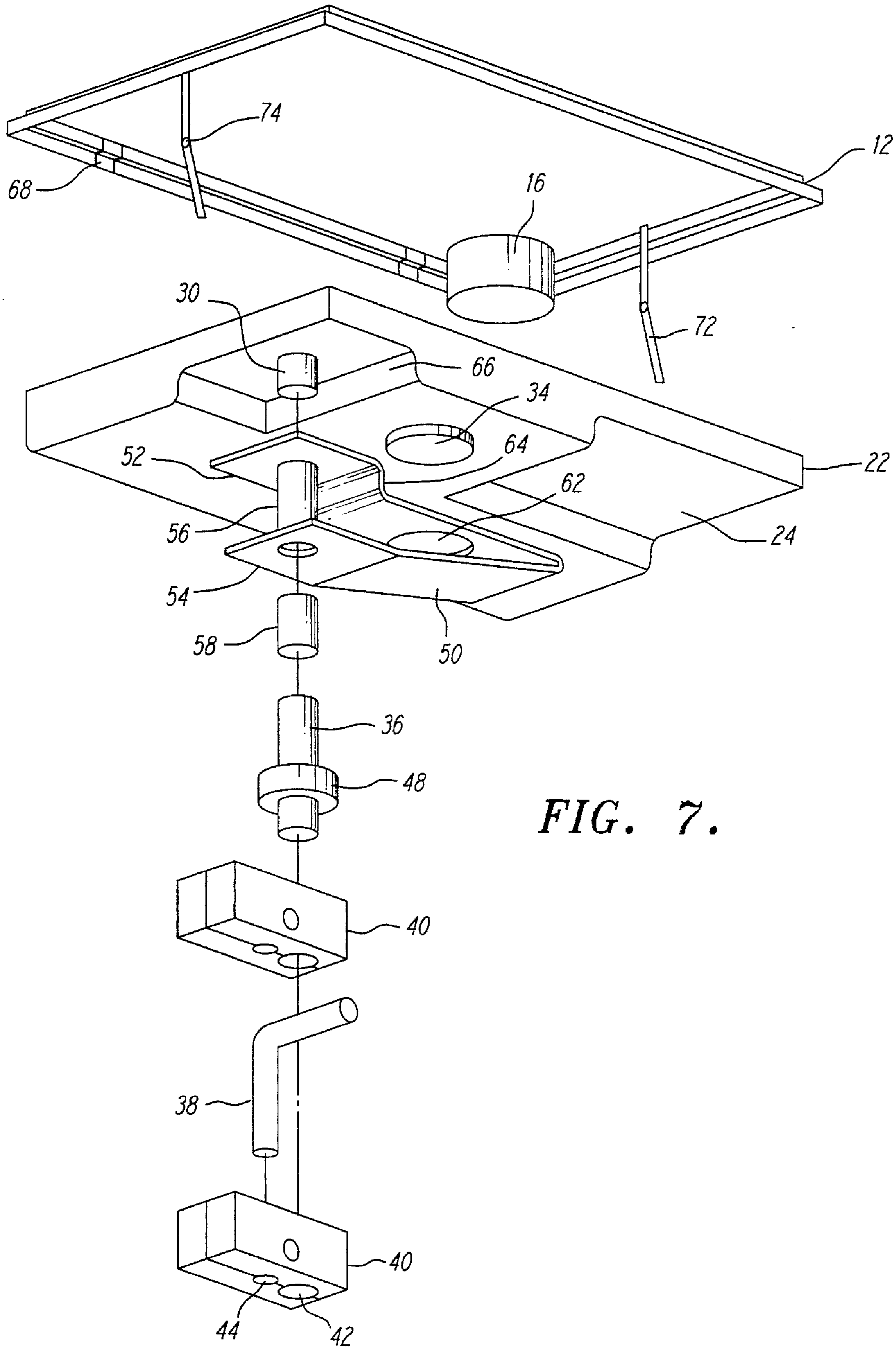
FIG. 7 is an exploded perspective view of the desk and the mounting apparatus.

Having described the desk 10 and its features, the preferred mounting assembly can be disclosed in detail. FIG. 6 and FIG. 7 illustrate the mounting of the desk 10 to a wheelchair, generally designated 37. A pivot rod 36 is attached to the wheelchair frame 38 with two clamps 40. Referring to FIG. 7, each clamp 40 has two holes 42 and 44. The large hole 42 clamps to the pivot rod 36, and the small hole 44 clamps to the wheelchair frame 38. Thus, the desk 10 can be quickly attached to any wheelchair 37 having a frame 38 without modifying the wheelchair 37. The height of the desk 10 can be adjusted by loosening the clamps 40 and raising the pivot rod 36 in the clamps 40 or by raising the clamps 40 on the wheelchair frame 38. Referring back to FIG. 6, the clamps 40 are loosened and tightened by knobs 46, and the knobs 46 are well within the wheelchair user's reach. This allows the wheelchair user to adjust the height of the desk 10 to a comfortable position while in the wheelchair 37. A set collar 48, placed on the pivot rod 36, provides a third method for adjusting the height of the desk 10 relative to the wheelchair 37. The set collar 48 may be raised and lowered on the pivot rod 36. Resting on the set collar 48 is the support adaptor 50. The body 22 in turn rests on the support adaptor 50. Thus, raising and lowering the set collar 48, raises and lowers the height of the desk 10.

Referring again to FIG. 7, a spacer 56 controls the distance between the top 52 and the bottom 54 of the support adaptor 50. The small peg lock 30 fits tightly into the top of the spacer 56. The small peg lock 30 then rests on a pivot bushing 58 which fits into the bottom of the spacer 56. In the preferred embodiment, the pivot bushing 58 is made of PVC and fits tightly up into the spacer 56. The pivot rod 36 then fits snugly into the pivot bushing 58. Because the pivot bushing 58 is made of PVC, the pivot rod 36 smoothly rotates inside the pivot bushing 58. Therefore, it is easy for the wheelchair user to independently move the desk 10 to a nonoperative position, and get out of the wheelchair.

Figure 8:
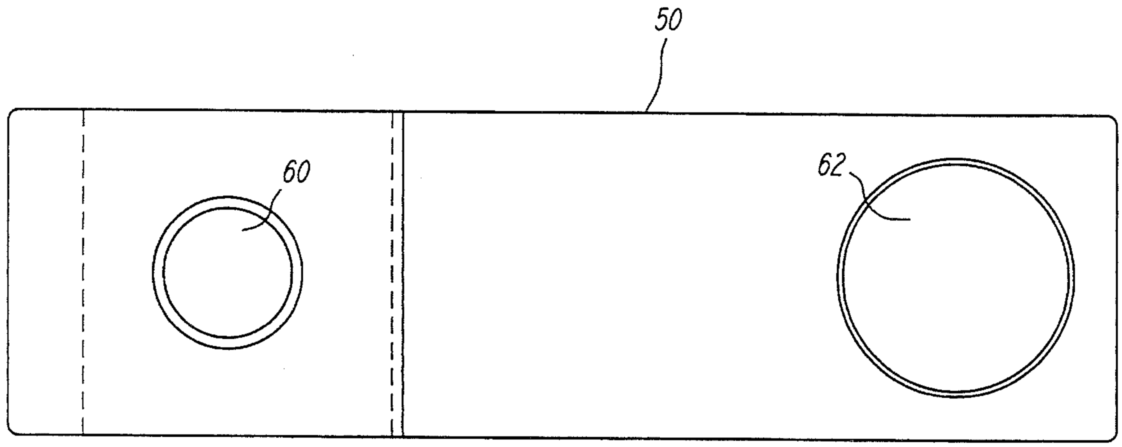
FIG. 8 is a top view of the support adaptor.
Figure 9:
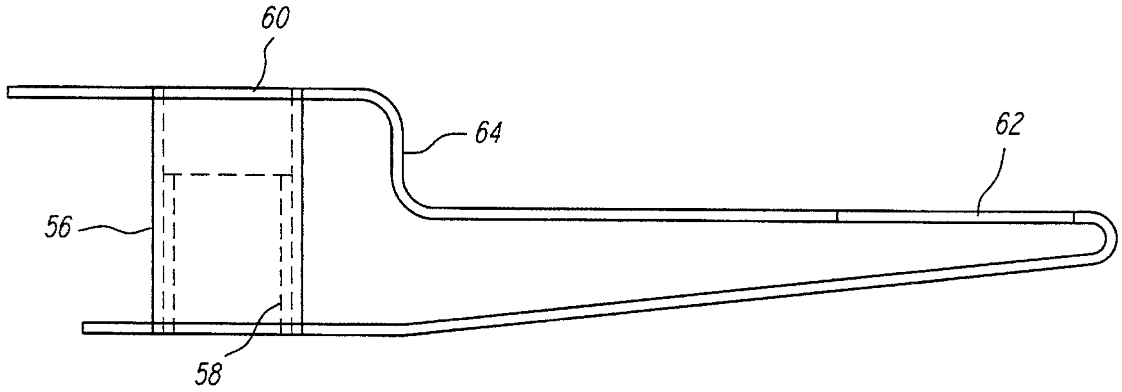
FIG. 9 is a side view of the support adaptor.

The detail of the support adaptor 50 and the spacer 56 assembly is illustrated by FIG. 8 and FIG. 9. The small peg lock 30 fits through the small peg hole 60, and tightly into the top of the spacer 56. The large peg lock 34 fits tightly into the large peg hole 62. The vertical wall 64 of the support adaptor 50 is in contact with the body 22 at 66 (see FIG. 7). Thus, the vertical wall 64 helps bear the moment created by the load on the desk 10. Consequently, the desk 10 may support heavy loads while maintaining its stability.

In the preferred embodiment illustrated by FIG. 1, the cover 12 is attached to the body 22 by snap spring clip hinges 68. The snap spring clip hinges are available from Atlec at 10 Bay Drive, Andover, Mass. 01845 and have part numbers 4–21 of series 100–200 component holder. In the preferred embodiment, the hinges are made from spring steel and are cadmium plated. The snap spring clip hinges 68 allow a person without fingers to remove and replace the cover 12. The hinges 68 align themselves when the cover 12 is placed on the body 22. The cover 12 then snaps off and on the body 22 by applying pressure up or down respectively to the back of the cover 12. The hinges 68 allow the cover 12 to pivot open by raising the front 70 of the cover 12. When the front 70 of the cover 12 is raised, the cover 12 pivots on the hinges 68 revealing the storage compartment 35. Thus, the user can conveniently access the storage compartment 35. The cover 12 is shown in an open position, and the cover 12 may be held in that open position with support latches 72 which are mounted on both sides of the body 22 and cover 12. Each support latch 72 has a latch hinge 74. By raising the front 70 of the cover 12 and pulling the support hinge 74 toward the front 70 of the cover 12, the cover 12 can be locked in the open position. The latch may also be of the type used to hold a car hood open. The latch would be pivotally attached to the body 22 or cover 12 and snap into the body 22 or cover 12 holding the cover 12 open.

The desk 10 is in its operative position extending across and above the wheelchair seat 76. The desk is free to pivot in a horizontal plane because the pivot rod 36 rotates inside the pivot bushing 58. Therefore, the wheelchair user can easily push the desk to a position beside and in front of the wheelchair. With the desk pushed to the side of the wheelchair, the user can exit the wheelchair without extra assistance.

FIG. 2 shows the cover 12 in a closed position, and, thus, the work area 14 is substantially horizontal. The cover 12 may be locked in the closed position by locks 78. In the preferred embodiment, the locks 78 are located on each side of the desk towards the front 70. The locks 78 prevent the desk from opening when the wheelchair 37 is on a hill or becomes up ended.

FIG. 3 illustrates the storage compartment 35 with the cover 12 removed from the body 22. When the cover 12 is removed, the body 22 functions as a carryall, and materials can be piled high on the body 22. Therefore, the wheelchair user can transport vast quantities of materials in only a few trips. Even with the cover 12 closed, the storage compartment 35 provides over 1,000 cubic inches of storage space.

Figure 10:
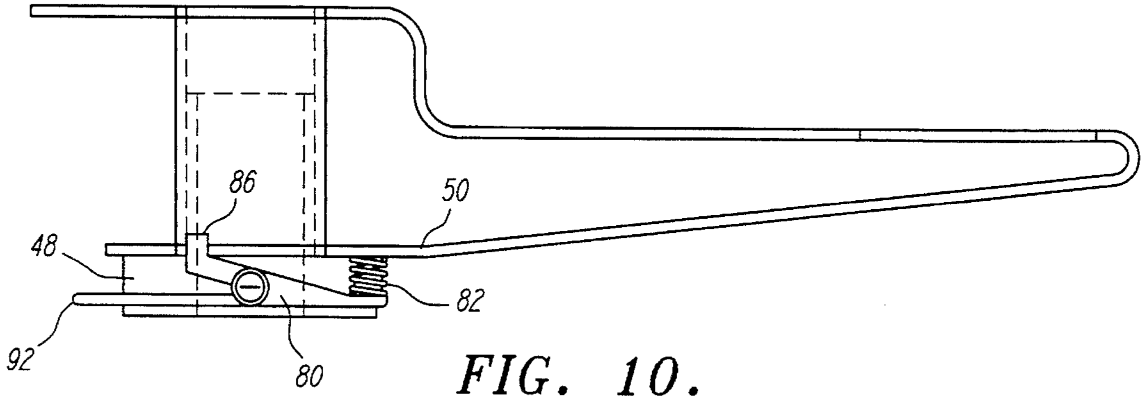
FIG. 10 is a side view of the spring lock mounted below the adaptor.

In another embodiment of the invention illustrated by FIGS. 10, 11, and 12, the desk can be locked into the operative position over the wheelchair's seat. This is accomplished by attaching a spring lock 80 next to the set collar 48 just below the adaptor 50. A spring 82 is placed in compression between one end of the spring lock 80 and the adaptor 50. An upward protrusion 84 on the spring lock 80 holds the spring 82 in place. When the desk is in its nonoperative position away from the wheelchair user, a hook 86 and the spring 82 slide on the bottom of the adaptor 50. At this point, the spring 82 is in high compression. When the desk moves into the operative position, the spring 82 forces the hook 86 upward so that it rests against the adaptor landing area 90, and prevents the desk from rotating in the direction shown by the arrow 88. At this point, the spring 82 is in a relatively lower compression. The adaptor landing area 90 is created by cutting a small section out of the adaptor 50. The desk is released from the operative position by pressing downward on the release end 92 of the lock 80. The spring 82 is placed in high compression, and the hook 86 is moved down out of the landing area 90. The desk may then be moved to its nonoperative position. Where the desk locks into place, can be adjusted by loosening the set collar 48 and rotating the set collar 48 and the spring lock 80 around the pivot rod 36.

Thus, a combination desk and storage compartment is disclosed which is mountable to any wheelchair. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A wheelchair comprising:

a frame, a plurality of wheels, and said wheels rotatably mounted on said frame;

a pivot rod attached to said frame;

a body pivotally attachable to said pivot rod said body pivoting in a horizontal plane, said body having a storage area, and said storage area is located within all of said body; and a cover having a generally flat surface, said cover pivotally, detachably attached to said body.

2. The wheelchair of claim 1 wherein said storage area is located in part directly above said pivot rod.

3. The wheelchair of claim 1 wherein said body has a geometric center and said body is substantially supported at said geometric center.

4. A wheelchair attachment for attachment to a wheelchair, comprising:

a supporting pivot rod attachable to the wheelchair;

a body pivotally attached to said pivot rod;

said body having a horizontal cross-sectional area and storage area;

said storage area located within all of said horizontal cross-sectional area;

said body has a geometric center and said body is substantially supported at said geometric center and a cover hingeably, detachably attached to said body.

5. The wheelchair attachment of claim 4 wherein the height of said body relative to the wheelchair is adjustable.

* * * * *